United States Patent [19]

Buchwald et al.

[11] Patent Number: 4,864,192
[45] Date of Patent: Sep. 5, 1989

[54] CRT MAGNETIC FIELD COMPENSATION

[75] Inventors: Randall H. Buchwald, Waukesha; Gary L. Mrotek, Franklin, both of Wis.

[73] Assignee: General Electric Company, Milwaukee, Wis.

[21] Appl. No.: 118,064

[22] Filed: Nov. 9, 1987

[51] Int. Cl.⁴ .............................................. H04N 9/29
[52] U.S. Cl. ...................................... 315/8; 315/370; 313/430
[58] Field of Search ................... 315/8; 361/150, 267, 361/149, 370; 313/430, 440; 335/213, 214; 250/313 VT

[56] References Cited

U.S. PATENT DOCUMENTS

| | | | |
|---|---|---|---|
| 2,994,803 | 8/1961 | Goldberg | 313/437 |
| 3,809,889 | 5/1974 | McBroom | 250/213 |
| 3,879,633 | 4/1975 | Stark, Jr. | 315/8 |
| 4,316,119 | 2/1982 | Cooper | 315/8 |
| 4,556,821 | 12/1985 | Cooper | 315/8 |

FOREIGN PATENT DOCUMENTS 1338244 11/1973 United Kingdom ................... 315/8

Primary Examiner—Donald J. Yusko
Assistant Examiner—Brian Palladino
Attorney, Agent, or Firm—Quarles & Brady

[57] ABSTRACT

As CRT display is housed in a magnetic shield to reduce the image distortions caused by the external magnetic field produced by an NMR scanner. To further improve image quality, three sets of compensating coils are positioned around the CRT display and inside the shield to produce magnetic fields which offset the effects of the residual external magnetic field components that penetrate the shield or enter through the window in the shield used to view the CRT screen.

3 Claims, 2 Drawing Sheets

CRT MAGNETIC FIELD COMPENSATION

BACKGROUND OF THE INVENTION

The field of the invention is display devices, such as cathode ray tubes, which are used within strong magnetic fields such as those produced by nuclear magnetic resonance (NMR) scanners.

NMR scanners are finding wide application in hospitals and clinics where they are employed to produce images of patients. NMR scanners employ very strong magnetic fields (0.5 to 1.5 Tesla) and are usually enclosed in a specially constructed room which isolates the scanner from radio frequency noise. The operator's console is positioned near the scanner where the patient can be observed and it is well within the strong magnetic field. The operator's console employs one or more displays which are used to display data and to produce images of the patient. Such displays usually employ cathode ray tubes (CRT) that project a beam of electrons onto a screen.

Severe distortion results when CRT displays are used in strong magnetic fields. An electron moving through a magnetic field is subject to forces that act to displace it from its intended path. This results in the electron beam not striking the phosphor screen in the proper location with a consequent distortion of the CRT image. When located near the NMR scanner, a CRT image is distorted to the point where it is virtually useless. While this distortion can be reduced by moving the display further away from the scanner, this is often not possible due to space limitations. The problem has been exacerbated by the use of large deflection CRT geometries which have longer beam paths and larger deflection angles.

The method presently used to reduce the effects of a magnetic field on the electron beam is to shield the CRT display with a ferromagnetic material. A housing of steel and mu metal is constructed arond the CRT and an opening is provided through which the screen can be viewed. While shielding is quite effective, the magnetic field still enters through the screen opening to produce distortion. This distortion can be further reduced by extending the shield forward from the CRT screen face, but such structures limit the angle at which the CRT display can be viewed.

SUMMARY OF THE INVENTION

The present invention is a magnetic field compensation circuit for a display which employs an electron beam. More specifically, the present invention includes three sets of coils which are separately energized by direct current to produce compensating magnetic fields. The first set of coils include a coil disposed along each vertical side of the display, the second set of coils includes coils disposed across the top and across the bottom sides of the display, and the third set includes a coil which wraps around the display to encircle the electron beam path. The current in each coil set is adjusted to offset the effects of the distorting magnetic field.

A general object of the invention is to reduce the distortion in a display device due to strong magnetic fields. The three coil sets produce compensating magnetic fields which are orthogonal to each other in the vicinity of the electron beam path. These compensating magnetic field components can be adjusted in value to precisely offset the three corresponding orthogonal components of the disturbing magnetic field. The net result is that the electron beam does not see a strong net magnetic field and it accurately hits the phosphor screen.

Another object of the invention is to enable the display to be located and oriented in any desired position. Once positioned, the dc power applied to each coil set is adjusted to precisely offset the corresponding components of the disturbing magnetic field.

A more specific object of the invention is to locate a CRT display close to an NMR scanner. The CRT is substantially enclosed in a ferromagnetic shield and an opening is formed in the shield through which the screen can be viewed. The first and second sets of coils are positioned within the shield and adjacent the opening to offset the fringe effects of the magnetic field at the opening.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
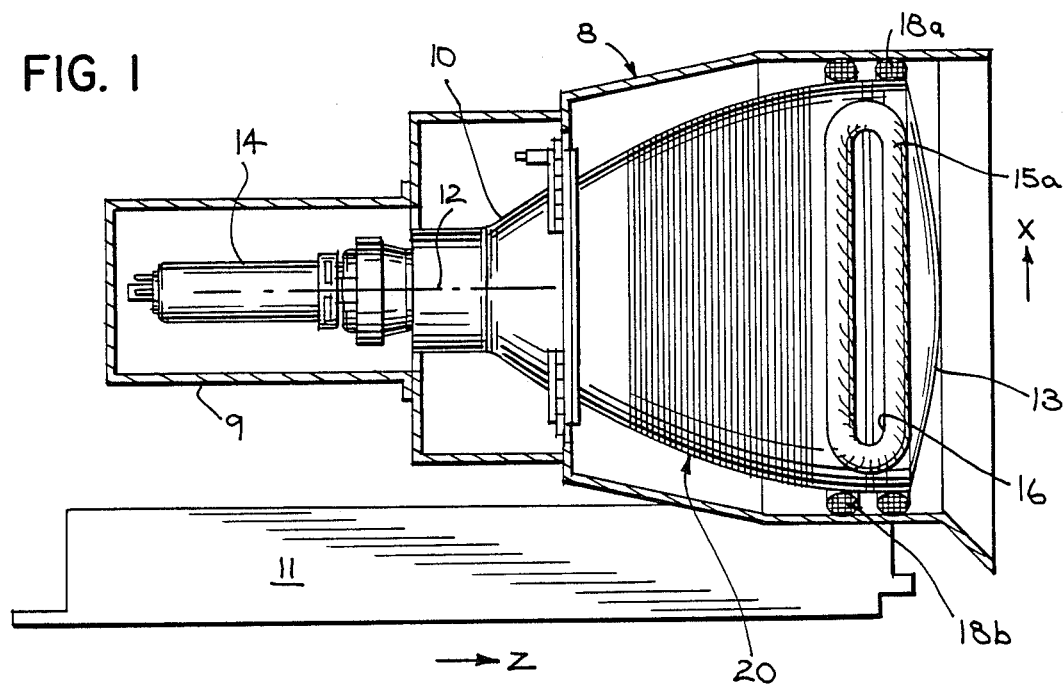
FIG. 1 is a side elevation view with parts cut away of a CRT display which employs the present invention.
Figure 2:
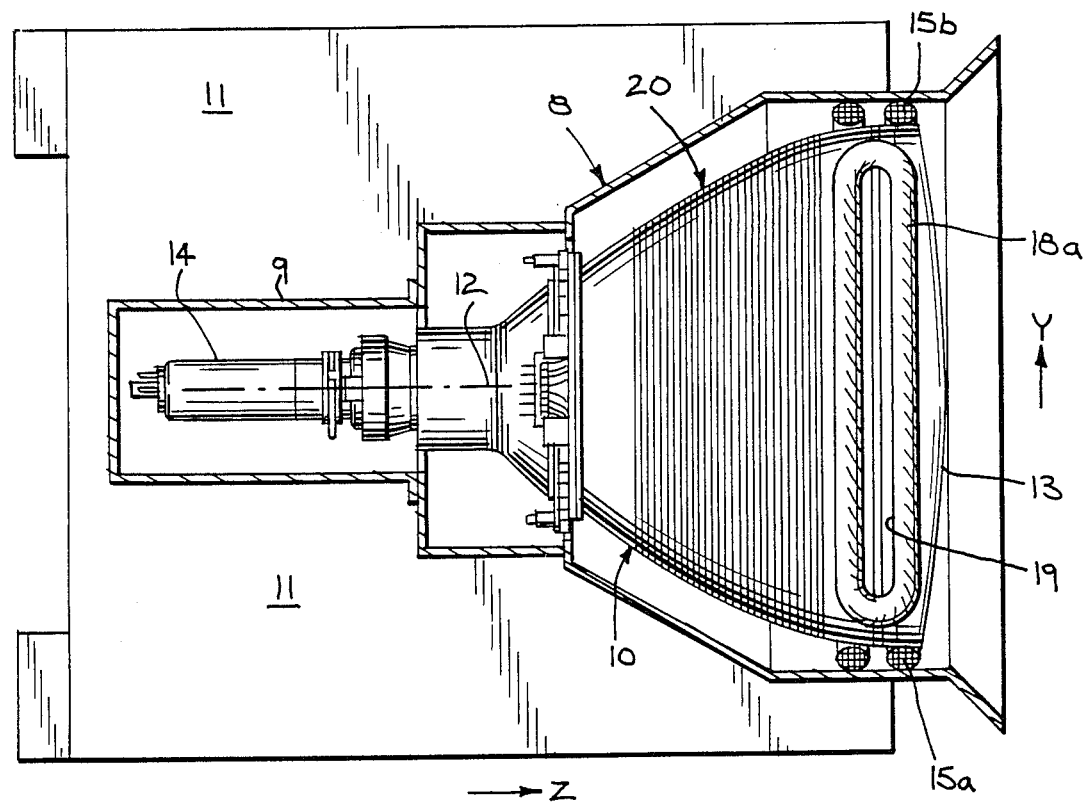
FIG. 2 is a top view with parts cut away of the CRT display of FIG. 1.

Referring particularly to FIGS. 1 and 2, a CRT 10 is mounted to a chassis 11 to form part of a display. The CRT 10 operates in a well known manner to produce an electron beam which is directed along a central beam axis 12 toward a phosphor screen 13. The electron beam is deflected by electrostatic or electromagnetic fields produced by plates located inside the CRT 10 or coils (not shown) located around the CRT 10. These fields are controlled by electronic circuitry to scan the entire face of the phosphor screen 13 and to thereby produce an image.

External magnetic fields will alter the path of the electrons as they traverse the distance between the electron gun 14 located in the neck of the CRT 10 and the screen 13. An electron entering a uniform magnetic field will experience forces that act in directions perpendicular to the magnetic flux lines. An electron with only velocity components perpendicular to the magnetic flux will enter a circular orbit around the flux line. Where an electron also has velocity components parallel to the flux lines, the electron will follow a helix path. The frequency of the orbit is a function of magnetic field strength and the charge-to-mass ratio of the electron (a constant). The radius of the orbit is a function of field strength, electron charge-to-mass ratio, and angular velocity. In practice, the disturbing external magnetic field is not perfectly uniform and it has flux components in all three directions. As a result, the electron will follow a complex path in its travel between the CRT gun 14 an the phosphor screen 13.

To reduce the deleterious effect of external magnetic fields, a shield 8 is constructed around the CRT 10. The shield 8 is constructed primarily of 3/16 inch sheet steel, except for a section 9 that surrounds the electron gun and which is made of mu metal. The shield 8 surrounds the CRT 10 on all sides except the front where a window is formed to enable the operator to view the screen 13. The shield 8 extends forward of the phosphor screen 13 to reduce fringe effects, but the picture is still distorted when the display is placed in strong magnetic fields such as those associated with NMR scanners.

To compensate for the effects of an external magnetic field having three orthogonal flux components, three sets of coils are mounted to the CRT 10. The first set includes a pair of coils 15a and 15b which are mounted along the vertical sides of the CRT 10 immediately behind the phosphor screen 13. The coils 15a and 15b are solenoids with their central opening 16 elongated to extend the entire vertical extent of the area through 13. The flux lines produced by the coils 15a and 15b are thus substantially horizontal and are substantially perpendicular to the electron beam path. Each coil 15a and 15b is formed from one hundred turns of #18 awg copper wire, or the equivalent, and the central opening 16 is approximately 7.25 inches long and 1.0 inch wide.

The second set of compensation coils 18a and 18b are disposed across the top and bottom sides of the CRT 10 and the magnetic field which they produce is substantially vertical across the entire lateral extent of the CRT 10 immediately behind the phosphor screen 13. Each coil 18a and 18b is wound as a solenoid having a central opening 19 which extends across the width of the image on the screen 13. The coils 18a and 18b each have one hundred turns of #18 awg copper wire, or equivalent, and the central opening 19 is approximately 9.75 inches in length and 0.9 inches in width.

The third coil set is a single coil 20 which encircles the CRT 10 over an area to the rear of the coil sets 15 and 18. The coil 20 is formed by forty turns of #14 awg copper wire and it is shaped to fit the form of the CRT 10. It is positioned forward of the deflection yoke, but well behind the phosphor screen 13. The coil 20 encircles the electron beam and it produces a magnetic field which is directed along the central beam axis 12 and is distributed over the entire lateral extent and height of the image on the screen 13.

Figure 3:
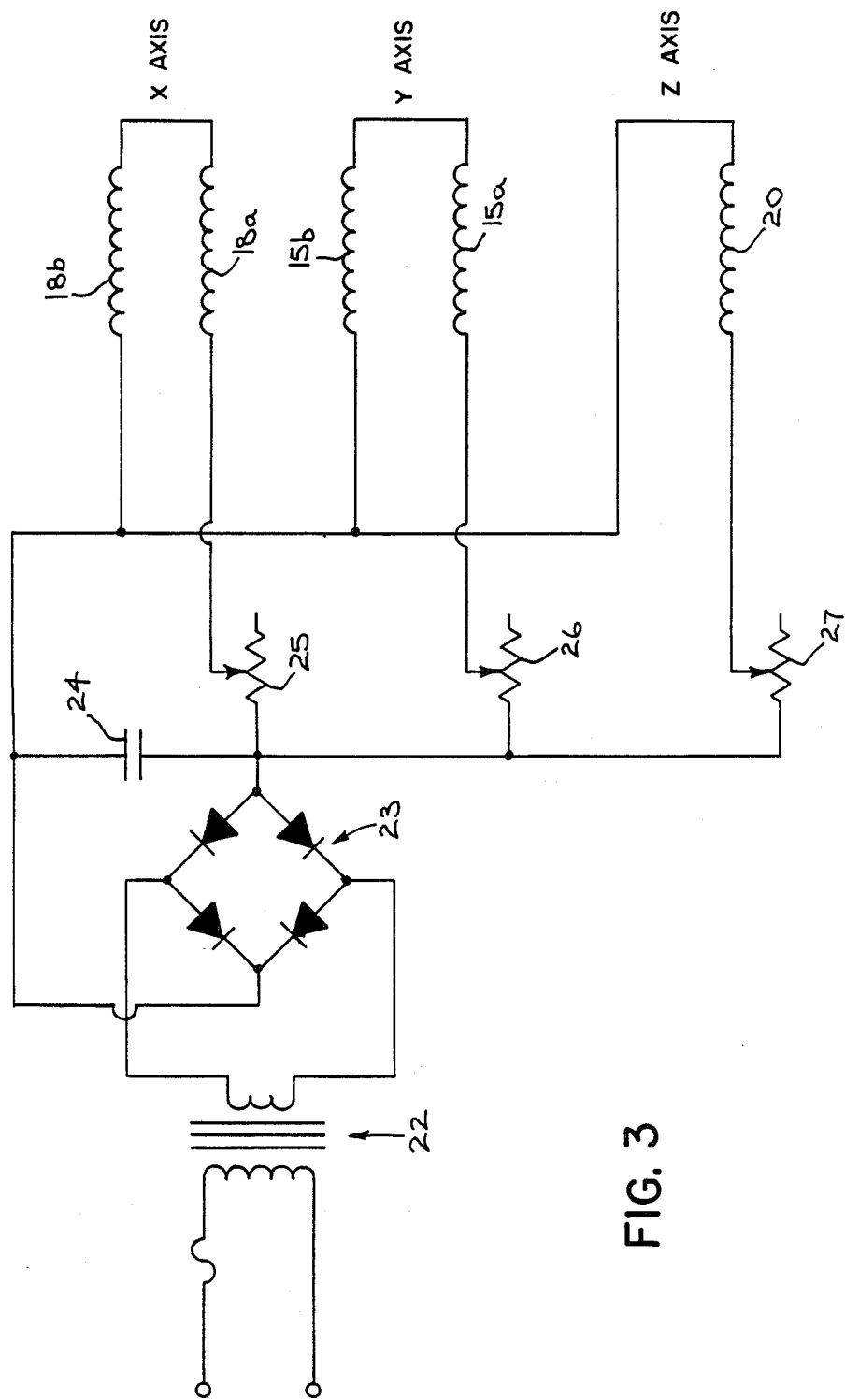
FIG. 3 is an electrical schematic diagram of the power supply for the coil sets which form part of the invention in FIGS. 1 and 2.

Referring particularly to FIG. 3, a dc power supply provides current to each of the coils sets 15, 18 and 20. The power line voltage is reduced to five volts by a step down transformer 22 and a full wave bridge rectifier 23 converts the alternating current to direct current. A 160,000 microfarad filter capacitor 24 smooths the direct current which is then applied to three one ohm, 25 watt, rheostats 25, 26 and 27. The rheostat 25 connects in series with the coils 18a and 18b, the rheostat 26 connects in series with coils 15a and 15b, and rheostat 27 connects in series with coil 20. By adjusting the rheostats, the magnitude of the current applied to each coil set 15, 18 and 20 may be adjusted so that the precise amount of compensating magnetic flux is produced.

The external magnetic field which is to be offset may be viewed as the sum of three orthogonal field components in the x, y and z directions. Each of these components has a different effect on the electron beam which is directed primarily along the z axis, but is deflected outward to introduce small x and y velocity components. When the electron beam is subjected to an x directed magnetic field component, the electrons will experience forces in both the y and z directions. The electron beam is accelerated in the CRT 10 by the final anode voltage and, hence, it has a definite velocity. The magnetic force in the z direction has the effect of changing electron velocity toward the phosphor screen 13 and, hence, changing the time that other forces have to work on the electron beam. This presents itself as a curving of the horizontal lines in the image and a shifting of the entire image in the y direction. A similar distortion occurs when y directed magnetic field components are present, except the image is shifted in the x direction. When the electron beam is subjected to a z directed magnetic field component, the electrons will experience both x and y direction forces.

The effect of these distorting forces on the image produced on the phosphor screen 13 is complex. In general, the net effect of the x and y directed forces is a uniform rotation of the image. However, due to the time of flight changes caused by the z directed forces and the longer flight time for electrons deflected at larger angles, the x and y forces operate differently on the electron beam during its scan with the result that an "S" curve distortion is superimposed on the rotation.

These distortions are removed by adjusting the rheostats 25–27 after the display has been fixed in position with respect to the external magnetic field. First, the compensating field produced by the z axis coil 20 is adjusted until the center of the image is corrected and the entire image rotates generally to the proper orientation. Then, the compensating fields produced by the x coils 18 and the y coils 15 are adjusted to square up the edges and corners of the image.

While a shield is employed in the preferred embodiment of the invention, it is possible to eliminate the shield and offset the full strength of the external magnetic field. In such case, the compensating magnetic fields must be much stronger and more electrical energy is consumed with the result that the display is less efficient to operate. When a shield is used, it should be designed to work in concert with the compensating field to minimize distortion. Also, while the present invention is shown being used with a CRT, other devices which are sensitive to distortions from external magnetic fields may also be compensated with the present invention.

What is claimed:

1. In a display which employs an electron beam for producing an image and which is subjected to an external magnetic field, the improvement comprising:

a first pair of coils, each disposed along an opposing side of the display, said first pair of coils being supplied with direct current to produce a net compensating magnetic field which extends horizontally across the path of the electron beam that forms the image and which deflects the electron beam;

a second pair of coils, one disposed along the top side and the other disposed along the bottom side of the display, said second pair of coils being supplied with direct current to produce a net compensating magnetic field which extends vertically across the path of the electron beam and which deflects the electron beam; and third coil which encircles the path of the image forming electron beam and which is supplied with direct current to produce a net compensating magnetic filed which extends in the general direction of the electron beam of the electron beam and which alters the velocity of the electron beam;

a current adjusting means associated with each pair of coils to adjustable control the current flowing through the associated pair of coils;

wherein the magnitudes of the dc currents supplied to said coils are adjustable to enable distortions in the image due to the external magnetic field to be reduced.

2. The improvement as recited in claim 1 in which a shield formed of ferromagnetic material is disposed around the display and said coils, and an opening is formed in the shield through which the image may be viewed by an operator.

3. The improvement as recited in claim 1 in which the display is a cathode ray tube.

* * * * *